March 15, 1960 — R. M. PAGE — 2,929,056
SIMULTANEOUS LOBE COMPARISON, PULSE ECHO LOCATOR SYSTEM
Filed Nov. 5, 1947 — 3 Sheets-Sheet 1
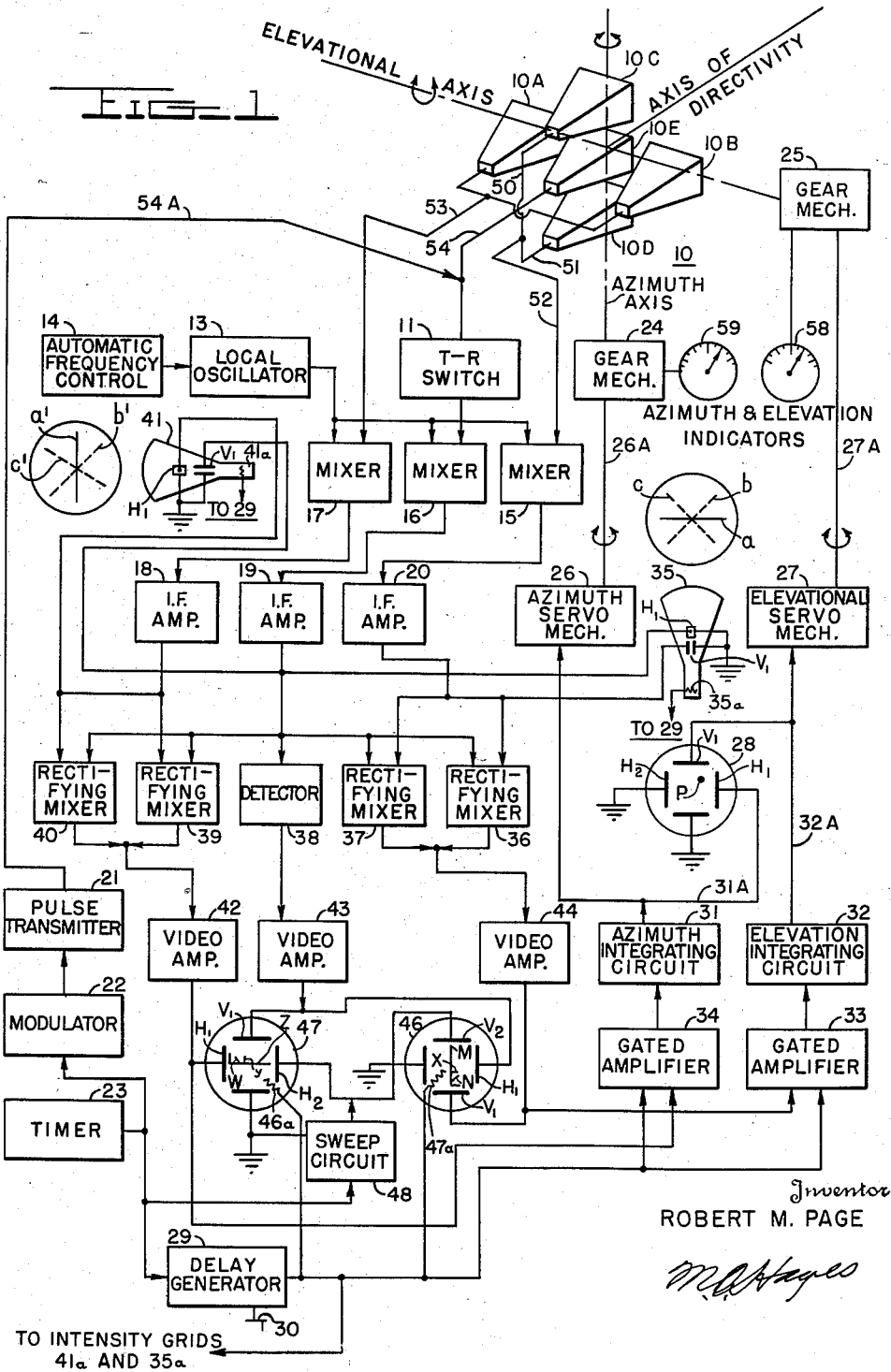
Inventor
ROBERT M. PAGE March 15, 1960  R. M. PAGE  2,929,056
SIMULTANEOUS LOBE COMPARISON, PULSE ECHO LOCATOR SYSTEM
Filed Nov. 5, 1947  3 Sheets-Sheet 2
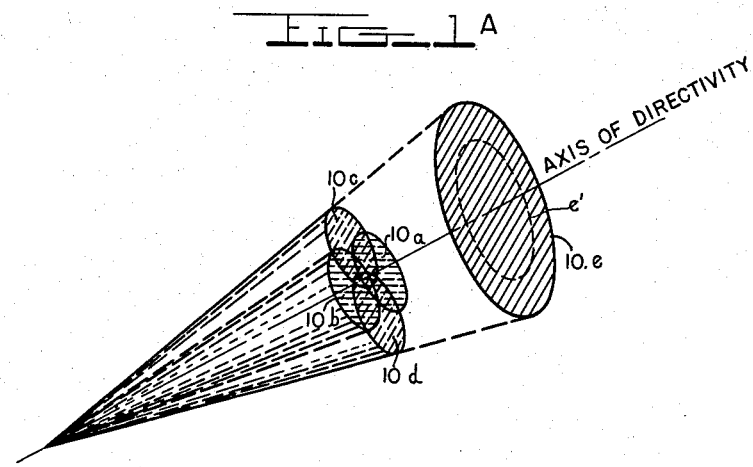
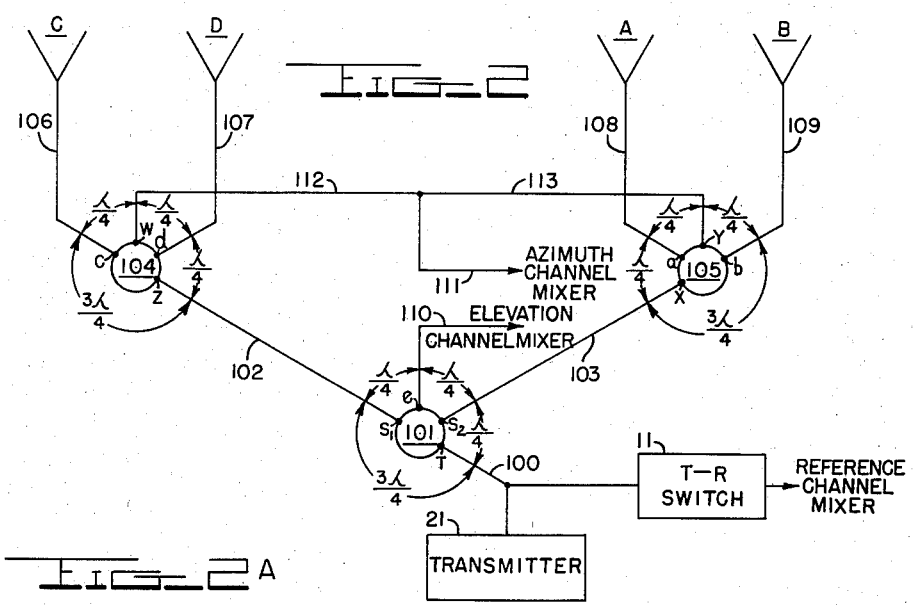
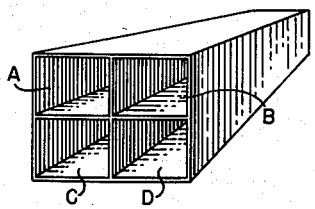
Inventor
ROBERT M. PAGE

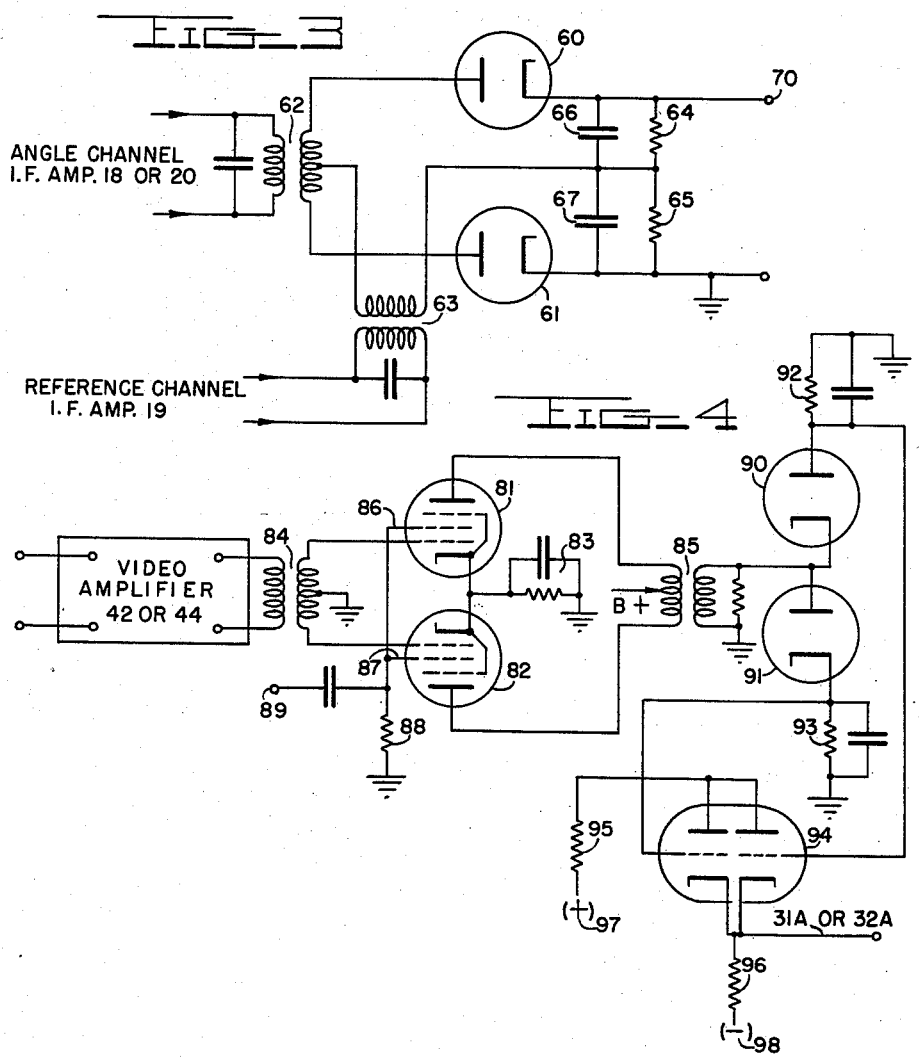

2,929,056
Patented Mar. 15, 1960

2,929,056

SIMULTANEOUS LOBE COMPARISON, PULSE ECHO LOCATOR SYSTEM

Robert M. Page, Washington, D.C.

Application November 5, 1947, Serial No. 784,209

10 Claims. (Cl. 343—7.4)

(Granted under Title 35, U.S. Code (1952), sec. 266)

This invention relates in general to radio locator systems and in particular to a novel type radio pulse echo system for determining range, elevation and azimuth of remote objects, and includes provisions for automatically tracking the movements of a selectable object or energy source.

In brief, the invention provides a receiving system which comprises a plurality of adjacent zones of simultaneous signal reception symmetrically disposed in opposing divergent angular relation about an axis of directivity. In the exemplary embodiment herein disclosed four divergent, overlapping zones of reception corresponding to up, down, right and left are employed and operated to receive an incoming signal in all zones simultaneously. Thereafter, the signals received from opposing angular zones are combined in phase opposition thereby to produce a difference signal for each pair of opposing angular zones. Each of the difference signals thus produced are endowed with a phase and an amplitude dependent respectively upon the sense and degree of angular displacement of the axis of directivity relative to the direction of arrival of the incoming signal. In the present illustration it is desired to determine both elevation and azimuth of a remote object, consequently two pairs of opposing angular zones of reception are employed; the difference signal produced by combining the signals received from the right and left zones of reception has a phase and an amplitude dependent respectively upon the sense and degree of azimuthal displacement of the axis of directivity. Similarly, the difference signal produced by combining the signals received from the up and down zones of reception has a phase and an amplitude dependent respectively upon the sense and degree of the elevational displacement of the axis of directivity. The difference signals having thus been given phase and amplitude characteristics which are representative of the sense and degree of the angular displacement are then employed in conjunction with suitable indicator apparatus for indicating and determining such angular displacements. It is to be understood, of course, that if it is desired to determine but one angle of the incoming signal source, that is azimuth or elevation, then only one pair of opposing zones of reception are needed.

In providing the feature of automatic tracking it is found desirable to convert the above mentioned radio frequency difference signals into elevation and azimuth error signals having a form more suitable for actuation of appropriate rotational control mechanisms for rotating the axis of directivity.

To this end and in accordance with the spirit of the invention I propose to accomplish such conversion by a method and means which has several distinguishing and desirable characteristics among which, as will hereinafter become evident, are circuit stability, simplicity, sensitivity and minimized responsiveness to noise and drift. More particularly, each of the radio frequency difference signals, preferably after first being subjected to amplification, is applied to a corresponding pair of rectifying mixer channels. Combined with each of the difference signals in their respective rectifying mixers is a received signal component having a reference phase, that is a phase which is substantially unaffected by the angular displacement of the axis of directivity relative to the line of arrival of the incoming signal. This signal is preferably in phase or 180° out of phase with the difference signal components depending on the phase of the latter. In combining the reference phase signal component with the difference signal components, the former is vectorially added to each of the difference signal components in one channel of each pair of rectifying mixers and is vectorially subtracted from each difference signal component in the other channel of each pair of rectifying mixers. The outputs from the rectifying mixer channels of each pair are then added in opposition to produce azimuthal and elevational error signals. In case the received signals are of the pulse variety such as is used in radar applications then the error signals appear as positive or negative video pulses depending on the sense of the angular displacement. In the event no angular displacement is present then the output from the rectifying mixers will cancel and the error signal output will be zero.

Error signals having the above form are suitable for use in operating additional range and bearing indicators or for subjecting to integration and control of conventional servo mechanisms for rotating the axis of directivity of the antenna into angular correspondence with the incoming signal source as will hereinafter be described in detail.

It is accordingly an object of this invention to provide a new and improved radio locator system for determining the position of an incoming signal source or of a remote object.

It is another object of this invention to provide a new and improved radio locator system for automatically following the changing position of a selectable moving object or energy source.

It is another object of this invention to provide a radio locator system having the foregoing features and employing simultaneous signal reception from a plurality of directional zones disposed in a predetermined angular relationship about an axis of directivity.

It is another object of this invention to provide a radio locator system of the pulse echo type wherein each individual pulse echo signal conveys information regarding the range, bearing and elevation of the remote object from which it was reflected.

Other objects and features of the present invention will become apparent upon a careful reading of the following detailed description when taken together with the accompanying drawings, in which:

Fig. 1 is a schematic diagram of one exemplary embodiment of the invention;

Fig. 1a is an illustration of one suitable type of antenna field pattern useful in practicing the present invention;

Fig. 2 is a schematic diagram of an alternate type of antenna useable with the invention;

Fig. 2a is a perspective view showing the positional organization of the radiating and receiving elements A, B, C and D of the antenna illustrated in Fig. 2, and Figs. 3 and 4 are circuit diagrams illustrating in detail certain of the components shown in block form in Fig. 1.

It will be expressly noted that although the detailed description which follows is directed specifically to a radio pulse echo system it is not intended that the principles of the invention be restricted thereto. For example, it is fully within the spirit of the present invention to use direct radiation from a remote object rather than echo energy for the source of received signals. Alternatively, the remote object may be provided with a repeating transmitter which transmits energy signals in response to the operation of the transmitting equipment associated with the invention.

Referring in particular to Fig. 1 there is shown a pulse echo system constructed in accordance with the teachings of the invention and arranged to determine range, elevation and azimuth of a remote object and for automatically tracking the same. Incorporated in the system is a directional antenna assembly 10 arranged to provide a confined field of transmission and reception including four adjacent zones of reception symmetrically disposed in opposing angular relation about an axis of directivity. For purposes of illustration the antenna has been shown as comprising five horn type wave guide elements having a centrally located radiating horn 10E with one receiving horn 10A and 10B positioned on each side thereof in the horizontal plane, and one receiving horn 10C and 10D positioned on each side thereof in the vertical plane. The entire array may be supported by a suitable mount, not shown, and adapted for rotation in elevation and azimuth.

The field pattern of antenna 10 is in general similar to that illustrated in Fig. 1a. The up and down receiving elements 10C and 10D of the antenna 10 provide vertically disposed diverging response pattern 10c and 10d. The right left receiving elements 10B and 10A of antenna 10 provide horizontally disposed diverging response patterns 10b and 10a. The transmitting element 10E of antenna 10 provides a beam pattern 10e which is centrally disposed with respect to the other response patterns. The transmitting pattern 10e may have a field of illumination which circumscribes the composite receiving pattern as indicated by the solid lines in the figure or alternatively it may be smaller than the composite response pattern as indicated by the dotted line e'.

From the antenna pattern shown in Fig. 1a it will be noted that energy received from a point lying on the axis of directivity will induce signals of equal intensity in all the elements comprising the receiving antenna. It is this circumstance where the axis of directivity is said to be "on bearing" with the signal source, and no error signals are derived from the system. Energy received however from any point off the axis of the directivity causes unequal amounts of energy to be induced into the respective antenna elements in proportion to and in accordance with the degree and sense of angular displacement of the axis of directivity relative to the line of arrival of the incoming signal source. In this circumstance error signals will be produced thereby to rotate the directional axis of the antenna into correspondence with the direction of arrival of the incoming signal.

The received signal induced in the up and down elements 10C and 10D of the antenna 10 are combined in phase opposition in transmission channel 52 by transmission means 50 and 51. Combining the two signals in phase opposition can be effected by making one of the transmission means 50 or 51 an odd integral number of one half wave lengths longer than the other, or by other phase reversing devices now well known to the art. The resultant energy signal appearing in channel 52 is applied as one input to an angle channel mixer 15. In a similar manner the energy induced in the right and left receiving elements of 10B and 10A of the antenna 10 are combined in phase opposition in common transmission channel 53 and is fed as one input to a second angle channel mixer 17. The receiving elements comprising the antenna assembly and the transmission channels inter-connecting opposing receiving elements are normally so balanced that when a signal is received from a point lying on the directional axis of the system no resultant energy will exist in either of the two transmission channels 52 or 53. Angular displacement in elevation alone will produce a resultant signal in channel 52. The phase and amplitude of this signal depends respectively upon the sense and degree of angular displacement. Likewise angular displacement in azimuth will produce a resultant signal in channel 53. The phase and amplitude of this signal depends upon the sense and degree of azimuthal angular displacement.

The centrally disposed element 10E of the antenna 10 as is herein exemplified is used for both transmission and reception purposes. In the receiving condition the energy induced in element 10E is applied through transmission means 54 and transmit-receive switch 11 to a reference channel mixer 16. The phase of the energy received by element 10E is substantially unaffected by angular displacement of the antenna and is either in phase or 180° out of phase with the resultant signal energies existing in channels 52 and 53 depending upon the phase of the latter signals, and therefore upon the sense of angular displacement.

For transmission purposes pulse transmitter 21 is provided, connected to element 10E through transmission channels 54 and 54A. Transmitter 21 is the type which is designed to emit recurrent high powered, high frequency pulses which are preferably spaced in time by an amount greater than their duration. The pulsing action of transmitter 21 is controlled by a modulator 22 which may be of any suitable construction operative for example to key the plate of the transmitter. The timing of transmitter 21 is in turn controlled by timer 23 which may, for instance, be a free running multivibrator or other source of low frequency signal generation. T-R switch 11 is a receiver protective device operative responsive to the pulsing of the transmitter 21 to decouple the receiver from radiating element 10E of the antenna and also operative during the quiescent periods of the transmitter to couple the reference channel mixer 16 to the same antenna element.

The received signals are heterodyned in their respective mixers 15, 16 and 17 by local oscillator 13. The resulting intermediate frequency signal appearing at the output of each of the mixers 15, 16 and 17 is applied to a corresponding IF amplifier channel 20, 19 and 18 respectively. If desired an automatic frequency control circuit 14 may be added to stabilize the frequency of the local oscillator 13. The intermediate frequency output of the elevation channel mixer 15 will have a phase depending on the phase of the input signal applied thereto by transmission channel 52 and will either be in phase or 180 degrees out of phase with the output from the reference channel mixer 16 depending on the sense of angular displacement in elevation of the directional axis of the antenna system. Likewise the phase of the signal output from the azimuth mixer channel 17 will have the phase of the azimuth channel input from line 53 and will either be in phase or 180 degrees out of phase with the reference mixer channel 16.

The amplified intermediate frequency output of each of the angle channel IF amplifiers 18 and 20 is applied to a separate pair of rectifying mixer stages 36, 37 and 39, 40. The intermediate frequency output of the reference channel amplifier 19 is applied to a detector 38 and also to each of the angle channel rectifying mixers 36, 37, 39 and 40 wherein the reference channel IF signal is combined with the angle channel IF signals. This combination is as aforementioned effected in an in-phase condition in one of the rectifying mixers of each pair and in a 180° out of phase condition with the angle channel IF signals in the other of the rectifying mixers of each pair. More particularly, this combination may be effected by applying the reference channel output in push-pull relation to each pair of rectifying mixers of both channels and at the same time applying the output from the angle channel amplifiers in parallel relation to their respective rectifying mixers, or vice versa.

The output of the reference channel intermediate frequency amplifier 19 is also applied to one deflection element of each of two cathode ray tube indicators 35 and 41. Indicator 35 is adapted to indicate angular displacement in elevation, and indicator 41 angular displacement in azimuth. In the illustration herein given the reference channel IF signal is applied to one horizontal deflection plate $H_1$ of the indicator tube 35 and to one vertical deflection plate $V_1$ of the indicator tube 41. The quadrature deflecting element of each of the indicator scopes 35 and 41 is connected to the output of its respective angle channel intermediate frequency amplifier 18 and 20. As herein shown horizontal deflection element $H_1$ of azimuth indicator tube 41 is connected to the ouput of the azimuth channel amplifier 18, and vertical deflecting electrode $V_1$ of elevation indicator tube 35 is connected to the output of the elevation channel intermediate frequency amplifier 20. As thus connected, indicator tubes 35 and 41 will provide a slant line sweep of the electron beam indicative of the elevational and azimuthal displacement of the axis of directivity relative to the incoming signal source. Specifically, when the axis of directivity points directly at the incoming signal source no signal output will appear from either of the angle channel IF amplifiers 18 and 20 thereby leaving only the output from the reference channel 19 to deflect the beam of the cathode ray tubes 35 and 41. In this circumstance the indication on the elevation indicator 35 will appear as a horizontal sweep of zero slope and that on azimuth indicator 41 will appear as a vertical sweep line indicating that the orientaiton of the antenna axis is "on target." This condition is represented by the solid sweep lines $a$ and $a'$ appearing on the face of tubes 35 and 41. If, however, the directional axis of the antenna is up in elevation with respect to the energy source then the down antenna element 10D will receive a stronger signal than that received by the up element 10C. In this condition a resultant difference signal will exist in the transmission channel 52, and the phase of this signal can be made by the proper adjustment of transmission line section 50 and 51 to correspond to the phase of the reference channel output. In this case the indication appearing on elevation indicator tube 35 will be a slant line angularly disposed from the horizontal and having a positive slope indicating that the directional axis of the antenna is up in elevation. This condition is represented by the dashed sweep line $b$ appearing on the face of indicator tube 35. The degree of the angular displacement will be indicated by the angle of the line. Conversely when the antenna axis is down in elevation the signal appearing in channel 52 will be reversed in phase and therefore opposite to that appearing in the reference channel 54. Accordingly the phase of the signal output from amplifiers 20 and 19 will be reversed from one another. In this case the beam sweep visible on the face of the elevational indicator 35 will have a negative slope, as indicated at $c$ on tube 35, indicating a downward displacement of the antenna. Again the angle of the sweep line will indicate the approximate degree of the displacement. In a similar manner the straight line indication appearing on tube 41 can be given a slope commensurate in value to the degree of "off bearing" in azimuth. The sense of the sweep line will indicate the sense of misalignment. For example, a slant line of positive slope $b'$ indicates off bearing to the right and a slant line of the negative slope $c'$ indicating off bearing to the left.

The output of each pair of rectifying mixing channels, 36, 37 and 39, 40 is combined in opposition. That is, the output of the azimuth rectifying mixers 39 and 40 are combined in opposition and that of elevational channel 36 and 37 are combined in opposition. The resultant signal has an amplitude proportional to the degree of angular displacement and a polarity indicative of the sense of the angular displacement. In the case of pulse modulation as in a pulse echo system, these signals will either be positive or negative video pulses depending on the sense of the displacement. The so combined output of the azimuth rectifying mixers 39 and 40 is applied to an azimuth video amplifier 42 and the combined output of the elevation rectifying mixer channels is applied to an elevation video amplifier 44. The pulse output from the reference detector 38 is derived solely from the reference channel IF amplifier 19 and is applied to video amplifier 43.

The pulse output from the azimuth video amplifier 42 is applied in parallel to one deflecting electrode $H_1$ of a range and azimuth cathode ray tube indicator 47 and to a gated amplifier 34. Similarly the pulse output from the elevation video amplifier 44 is applied in parallel to one vertical deflecting electrode $V_1$ of range and elevational cathode ray tube indicator 46 and to a second gated amplifier 33. The video output of the reference channel amplifier 43 is applied in parallel to the deflecting plates $H_1$ and $V_1$ of indicator tubes 46 and 47 respectively. The purpose of indicator tubes 46 and 47 is to indicate object range and angular displacement respectively of the energy source being viewed. To this end a saw-tooth sweep generator indicated at 48 is added and arranged to apply a horizontal sweep via deflecting plate $H_2$ to the azimuth indicator 47 and a vertical sweep via deflecting plate $V_2$ to the elevational indicator 46. The output of the saw-tooth generator 48 operates to produce a linear time base on the indicator tubes 46 and 47 by sweeping the electron beam of tube 47 from left to right and the electron beam at tube 46 from down to up synchronously with the transmission of each pulse. Synchronization of the action of the sweep generator 48 and of the pulsing of transmitter 21 may be obtained by connecting the sweep generator 48 to the timer 23. As thus arranged the time base appearing on the azimuth range indicator tube 47 is in the horizontal plane and that appearing on the face of the elevation range indicator 46 is in the vertical plane. Although this type of presentation is not necessary to the operation of the system it is helpful in distinguishing the azimuth and elevation indicators when the two are arranged in juxtaposition.

Each received signal will produce an output from the reference channel video amplifier 43 which in turn will produce a vertical pip, as at $y$ on the azimuth indicator 47 and a horizontal pip as at $x$, on the elevation indicator 46. These indications are displaced from the initiation of the sweep by an amount proportional to the range of the object producing the reflection. The time bases are formed on each of the indicator tubes 46 and 47 may be range calibrated by electronically produced timing pulses obtained by apparatus now well known to the art or by a graduated scale etched on the face of the cathode ray tube indicator.

Signals received from sources displaced from the axis of the antenna will produce outputs from video amplifiers 42 and 44 as well as from the video amplifier 43. The amplitude of the angle channel signals is dependent on the degree of the angular displacement and the polarity of the signals will be determined by the sense of such displacement. If the axis of the antenna is off "left" in azimuth from the incoming signal energy, a negative pulse for instance, will appear at the output of the azimuthal video amplifier 42 and will be applied to the horizontal vertical deflecting plate $H_1$ of tube 47. In this case where the output from the azimuthal video amplifier 42 is a negative polarity, the same will reinforce the action of the sweep generator 48 to thereby tilt the echo indication, as at $z$, to the right indicating off bearing "left" from the echo. Conversely, off bearing "right" will produce a positive pulse signal at the output of the amplifier 42 which will oppose the sweep action of generator 48 to tilt the corresponding echo signal to the left, as at $w$, indicating off bearing "right." "On bearing" is of course indicated, as at $y$, by a pip perfectly normal to the time base. In a similar manner the condition of angular displacement in elevation will tilt the resulting indication appearing on indicator 46 in a direction from the normal which is indicative of the sense of angular displacement. For instance, when the antenna axis is "up" in elevation a positive signal will appear at the output from elevation video amplifier 44 and will be applied to the vertical deflecting electrode $V_1$ thereby to oppose the action of the sweep generator 48. Again this signal is of such a polarity as to cause a downward tilt, as at M, of the indication, thus indicating "up" in elevation. Conversely "down" in elevation will produce a negative output from video amplifier 44 to produce an upward tilt, as at N, of the indication.

In tracking objects in elevation and azimuth as herein proposed it is desired to track only a selectable object to render the tracking system non-responsive to all other objects within the range of the system. To this end the gated amplifiers 34 and 33 are provided and are of the type which are normally blocked to output signals from video amplifiers 42 and 44 except those occurring from a selectable range. At the instant of arrival of a selected echo signal gated amplifiers 34 and 33 are rendered momentarily operative, preferably for the duration of the selected echo, by an output from delay generator 29. Delay generator 29 is of well-known construction such as a self restoring pulse producing multivibrator operative responsive to the output from timer 23 to produce a gating pulse for gating amplifiers 33 and 34 at an instant selectably delayed in time from the transmission of a pulse from transmitter 21. The time relationship between the occurrence of a gating pulse as produced at the output from delay generator 29 and the reception of the selected echo may be monitored by applying the output from generator 29 to either or both range indicators 46 and 47, such as to their intensity grids 46A and 47A. Similarly, and for purposes of rendering only a select echo visible on the bearing indicator tubes 35 and 41 the output from delay generator 29 may be applied to intensity grids 41a and 35a of indicator tubes 41 and 35. The indications produced by these tubes being normally blocked except during the occurrence of an output pulse from delay generator 29. Hand wheel 30 controls the delay between the transmission of a pulse and the occurrence of an output from generator 29. Accordingly, by calibrating hand wheel 30 in terms of range another indication is provided of the range of the object being tracked.

The pulse signal output from the gated amplifiers 34 and 33 which is either positive or negative in accordance with the angular displacement of the antenna axis is applied to a corresponding integrating circuit 31 and 32. In particular the output from azimuth video amplifier 42 is applied through gated amplifier 34 to azimuth integrating circuit 31, and the output from elevation video amplifier 44 is applied through gated amplifier 33 to elevation integrator 32. The output from the respective integrators 31 and 32 is in the form of a direct voltage the sign of which depends on the polarity of the signal output from the respective video amplifier 42 or 44. For instance, if the video signal applied to the integrating circuit 31 is positive then the signal output therefrom appears as a positive direct voltage on lead 31A and if negative the output appears as a negative direct voltage. Similarly a positive video input to integrator 32 produces a positive direct voltage output on lead 32A, and a negative video input thereto produces a negative direct voltage output. The output lead 31A from the azimuth integrating circuit 31 is applied to the horizontal deflecting plates $H_1$ of cathode ray tube indicator 28 and the output lead 32A from the elevation integrator circuit 32 is connected to the vertical deflection plate $V_1$ of indicator tube 28. This indicator tube provides a spot indication which is displaced from the center of the viewing screen in accordance with both elevational and azimuthal displacement of the antenna axis relative to the signal source. If the signal input to integrator circuit 31 from the gated amplifier 34 is positive as it would be in case the signal source is off bearing to the right, for instance, a positive direct voltage output will appear on lead 31A to thereby deflect the beam of indicator tube 28 off center to the right. Likewise if the input signal applied to integrator circuit 32 is positive as would be in the case the signal source is off elevation "up" from antenna axis then a positive direct signal will appear on lead 32A deflecting electron beam of tube 28 in an upward direction. The resultant position of the electron beam spot will appear in the first quadrant, as at P, indicating misalignment of the antenna in elevation and azimuth. The condition of "on target" being, of course, indicated when the spot is centered on the face of the viewing screen.

The outputs from the integrator circuits 31 and 32 are also applied to suitable servo mechanisms 26 and 27 which are coupled by shafts 26A and 27A to gear mechanisms 24 and 25 for positioning the antenna in azimuth and elevation, respectively. Servo mechanisms 26 and 27 are preferably of the type which will rotate shafts 26A and 27A in either direction in accordance with the polarity of the applied direct voltage from the integrator circuits, and will stop rotation of the shafts in response to zero applied signal. A pair of indicator mechanisms 58 and 59 may be coupled to the elevational and azimuthal rotational axis of the antenna and rotated therewith to indicate mechanically the angular bearing and elevation of the object being tracked.

Fig. 2 illustrates in simplified schematic form an alternate antenna array also suitable for use with this invention. This antenna differs from that illustrated in Fig. 1 in that only four elements A, B, C and D are necessary for carrying on transmission and reception. Thus, this antenna has an advantage over that of Fig. 1 in that it eliminates the necessity of utilizing the separate radiating element 10E. In practice, the antenna elements A, B, C and D may be arranged in juxtaposition, as better illustrated in Fig. 2A to form four quadrants of radiation and reception.

In transmitting, the energy from transmitter 21 is applied through wave guide 100 to a first wave guide junction ring 101 and thence through a pair of wave guide transmission lines 102 and 103 to a pair of wave guide junction rings 104 and 105. The latter junction rings are similar in construction to junction ring 101 and comprise, in a simplified form, a ring shaped wave guide section of suitable circumferential length having a plurality of tap points taken at certain selected points about its periphery. Junction rings 104 and 105 connect the antenna elements A, B, C and D together and to the first junction ring 101. The transmitted energy entering wave guides 102 from guide 100 has two paths of propagation about junction ring 101; one clockwise from the transmitter tap point T and the other counter clockwise. As indicated in the drawing the tap point $S_1$ of guide 102 is taken at a point diametrically opposite the transmitter tap point T. Hence the two paths of propagation will be equal in length and the energy arriving at tap $S_1$ will be in phase addition and will therefore reenforce in guide 102. Similarly, the energy entering guide 103 from guide 100 arrives from two paths of propagation about junction ring 101; one clockwise from tap point T and the other counter clockwise. More particularly, the second path as indicated in the drawing is one quarter wave length long; and the first path is five quarter wave lengths long. In other words the two paths differ in length by one full wave length, but since this difference is an integral number of full wave lengths, the energy entering guide 103 from the two paths of propagation will be in phase and therefore reenforce in guide 103. Due to the fact, however, that the energy entering guide 103 from transmission line 100 travels a path either one quarter or five quarter wave lengths long in traversing junction ring 101 while the energy entering guide 102 travels a path three quarter wave lengths long the energy entering guide 103 will be 180° out of phase with that in guide 102. Therefore to properly phase the signals for transmission, the energy in guide 102 or 103 is inverted in phase as by making one of the guides 102 or 103 one half wave length longer than the other, or by utilizing other phase reversing means now known to the art. Again the energy arriving at tap e from the transmitter guide 100 also has two paths of propagation about the junction ring 101; one extends clockwise from tap T to tap e and the other counter clockwise. As indicated in the drawing the first is one full wave length long and the second is one half wave length long. The two paths of propagation to this tap therefore differ by one-half wave length. Thus the energy arriving at tap e from guide 100 will be in phase opposition thereby permitting very little or no transmitted energy at all to enter guide 110. Tap point e as will hereinafter be described serves as a suitable point for deriving a resultant difference signal component for feeding the elevational channel mixer 15 of the apparatus shown in Fig. 1.

In a similar manner the energy entering guide 106 and thereby transmitted by horn C has two paths of propagation about junction ring 104 from guide 102; one clockwise from tap point Z to tap point C, and the other counter clockwise. As indicated, tap points C and Z are at diametrically opposite points on junction ring 104; hence, the energy entering guide 106 from guide 102 will be in phase addition and will therefore reenforce as the same is propagated along guide 106 and transmitted by horn C. Similarly, the energy entering guide 107 and thereby transmitted by horn D also has two paths of propagation about junction ring 104 from guide 102. The first path is clockwise from tap point Z to tap point D and is five quarter wave lengths long. The second is counter clockwise and is one quarter wave length long. Hence, the energy entering guide 107 from guide 102 is unattenuated. Again the energy arriving at tap W from guide 102 also travels two paths. In this case, as the drawing indicates, the paths differ by one half wave length thus making the energy arriving at this tap from guide 102 cancel. This tap point, as will hereinafter be described serves as a suitable point for deriving a resultant difference signal component for feeding the azimuth channel mixer 17 of the apparatus shown in Fig. 1.

It will be noted from the foregoing that the paths of propagation of the energy traversing junction ring 104 and entering guide 106 from guide 102 are each equal to three quarter wave lengths; whereas the propagation paths of the energy entering guide 107 from guide 102 is either one quarter or five quarter wave lengths long. Thus the energy reaching guide 107 travels a path either a half wave length longer or shorter than the energy reaching guide 106. Hence, the transmitter energy appearing at taps C and D is in phase opposition. Accordingly, in order to make the phase of the energies transmitted by the respective horns C and D coincide one of the transmission guides 106 or 107 should invert the phase of the transmitter energy before the same is radiated into space. This can be accomplished by making one of the guides 106 or 107 one half wave length longer than the other, or by twisting the guide itself, or by any other means now well known to the art.

In a similar manner the transmitting energy entering guides 108 and 109 from guide 103 and thereby transmitted by antenna horns A and B each have two paths of propagation about junction ring 105. In each instance the energy arriving at taps a and b from guide 103 reenforce one another and are thereby unattenuated by the junction ring 105. Again the phase of the energies in one of the guides 108 and 109 must be reversed before the same is emitted by its respective antenna horn. In this connection it should be noted that the energy simultaneously emitted by horns A, B, C and D is to be in phase coincidence. Again the transmitting energy reaching tap point y is out of phase and thus cancels. Tap points w and y are connected together by lines 112 and 113 and their combined output is fed through guide 111 to the azimuth channel mixer 17.

In the receiving condition, energy is picked up simultaneously by all four horns A, B, C and D and propagated through the respective junction rings 104 and 105 to the first junction ring 101 where the energies are added in phase and applied through guide 100 and transmit receive switch 11 to the reference channel mixer 16. At the same time any difference in the intensities of the signals received by the horns A, B, C and D, as would be caused by receiving a signal emanating from a point off the axis of antenna directivity, will be applied through either guide 110 or 111 or both depending upon the sense of the angular displacement.

In particular the energies simultaneously received by horns A and B are applied through their respective wave guide transmission lines 108 and 109 to junction ring 105. As previously mentioned one of the guides 108 or 109 contains a phase reversing device, hence the energies simultaneously entering junction ring 105 at taps a and b from horns A and B will be in phase opposition. The received energy traversing junction ring 105 and entering guide 103 from horn B has two paths of propagation about the junction ring. In this case the paths are of the same length both equal to three quarter wave lengths long. Simultaneously, the received energy traversing junction ring 105 and entering guide 103 from antenna horn A also two paths of propagation about junction ring 105; the first clockwise from tap point a and the second counter clockwise. The first is five quarter wave lengths long, and the second one quarter wave length long. Hence the received energy traversing junction ring 105 and entering guide 103 from horn A travels a path one half wave length longer or shorter than the energy entering guide 103 from horn B. This difference in path lengths would normally cause the energies entering guide 103 from horns A and B to appear in phase opposition except for the fact that these energies are phase opposed as they enter the junction ring 105. Hence the half wave length difference in their propagation paths about this junction ring 105 causes the same to appear in phase addition in guide 103. In a similar manner the simultaneously received energies traversing junction ring 104 and entering guide 102 from horns C and D are added therein in phase coincidence. Again in a similar manner, the received energy summations traversing junction ring 101 from guides 102 and 103 are likewise added in phase coincidence in guide 100 and applied as the received reference signal to the reference channel mixer 16.

To derive a resultant signal component from the simultaneously received signals which is indicative of the azimuthal angular displacement of the axis of directivity relative to the direction of arrival of the incoming signal, the simultaneously received energies impinging on horns A and B which occupy the upper two quadrants of Fig. 2A are applied to junction ring 105 at taps a and b and removed by guide 113 located at tap y. As will be noted from the drawings, tap y is taken at a point symmetrically disposed with respect to taps a and b. Thus since the received energies applied to the junction ring 105 at taps a and b are in phase opposition the same will combine in phase opposition in guide 113. Likewise, the signals simultaneously received by horns C and D and applied to junction ring 104 at taps c and d are combined in phase opposition in guide 112. Thus when the intensity of the signal impinging on horns A, B, C and D are equal the energies combined in guides 112 and 113 will cancel. A differential in the intensity of the signal impinging on horns A and B and C and D, however, will cause a resultant signal component to exist in each guide 112 or 113. The phase of the resultant signals and their amplitude are of course respectively dependent upon the sense and degree of such angular displacement.

These resultant signals are then combined in phase addition in guide 111 and applied to the azimuthal channel mixer 17.

From the foregoing it will be seen that if a', b', c' and $d'$ equal respectively the intensities of the received signals impinging on antenna horns A, B, C and D then, the resultant signal components appearing in guides 112 and 113 respectively will be:

$$(c'-d') \text{ and } (a'-b')$$

The combined signal intensity appearing in guide 111 will become $$(c'-d')+(a'-b')$$

rearranging, this expression reduces to $$(a'+c')-(d'+b')$$

or in other words the combined signal intensity as applied to the azimuth channel mixer through guide 111 is equal to the difference between the sum of the signals received by both left hand antenna horns B and D and the sum of the signals received by both right hand horns, A and C, which is in full accord with the operating principles of the invention.

In order to derive a second resultant signal component from the received signal which is indicative of the elevational displacement of the antenna axis and direction of signal arrival, the signals applied to junction ring 101 by guides 102 and 103 are removed at tap point $e$ by guide 110. As will be understood from the symmetry of the array and from the foregoing discussion, signals received by antenna elements A and B and entering guide 103 through junction ring 105 will be in phase and will therefore reenforce in this guide; similarly signals received by elements C and D and entering guide 102 through junction ring 104 will likewise be in phase and will also reenforce. As these signals enter junction ring 101 the same will be 180° out of phase due to the aforementioned phase reversing device incorporated in one of the guides 102 or 103. These signals are then combined in phase opposition in guide 110 and their difference is applied to the elevational channel mixer 15.

Again, if the intensity of the received signals impinging on the antenna horns A, B, C and D be designated as $a'$, $b'$, $c'$, and $d'$, respectively then the signal intensity entering guide 103 will be: $a'+b'$.

Likewise the signal intensity entering guide 102 will be: $c'+d'$.

And finally the resultant signal difference entering guide 110 will be:

$$(a'+b')-(c'+d')$$

or in other words the resultant elevational difference signal will be equal to the difference between the sum of the signals received by the upper two elements A and B (Fig. 2A) and the sum of the signals received by the lower two elements C and D.

For purposes of illustration there is exemplified in Fig. 3, to which reference is now made, a circuit suitable for use as one pair of rectifying mixers indicated at 36 and 37 or 39 and 40 of Fig. 1. The particular circuit herein illustrated is similar in construction to a type of frequency discriminator circuit well known to the art, and comprises a pair of diode vacuum tube elements 60 and 61 the plates of which are connected to opposite terminals of the secondary winding of an intermediate frequency transformer 62. The cathode of diode 61 is connected to ground while the cathode of diode 60 is connected to an output terminal 70 and also to ground through a pair of serially connected resistance elements 64 and 65. Each of the resistances is shunted by a corresponding capacitor 66 and 67 which provide an intermediate frequency by-pass to ground. The junction point of the resistances and capacitors is connected via the secondary winding of intermediate frequency transformer 63 to the mid-point of the secondary winding of transformer 62. The connection of the circuit to the intermediate frequency amplifier channels of the receiver is so made that one of the intermediate frequency transformers, 62 for example, is energized from the output of the corresponding angle channel IF, amplifier 18, for instance, and the other intermediate frequency transformer 63 is energized from the output of the reference channel IF amplifier 19. It is understod, of course, that these latter connections can be reversed without impairing the operating characteristics of the circuit.

As will be noted from the drawing, the output of the IF transformer 62 is split in phase thereby applying a push-pull signal to the plates of the diodes 60 and 61, while the output from transformer 63 is applied in parallel to the plates of the diodes. As aforementioned, the angle channel intermediate frequency signal will either be in phase or 180° out of phase with the intermediate frequency signal from the reference channel. Thus with the above circuit connections the vector resultant signal applied to one diode will be additive and the other subtractive. If, for example, the signals applied to diode 60 add and those applied to diode 61 subtract then a positive output signal will appear at terminal 70. If the reverse is true then a negative signal will appear at the output terminal 70. This output signal takes the form of the modulation components impressed on the received signal, which in the case of a radar signal will be in the form of a video pulse.

It will be noted that in the instance where the signal output from the angle channel IF amplifier is zero, denoting a condition of angular correspondence insofar as that particular angle channel is concerned, then the output signal appearing at terminal 70 will likewise be zero. It will also be noted that noise signals generated in the receiving channels preceding the rectifying mixers will be combined in opposition at the rectifying mixers and will thereby tend to cancel. This feature makes possible a locator system which is less affected by locally generated noise than any similar system heretofore available.

In Fig. 4 there is illustrated a circuit suitable for performing the functions of one of the gated amplifiers and integrator circuits respectively indicated at 34 and 31 or 33 and 32 in Fig. 1. The gated amplifier is shown as comprising a pair of pentode vacuum tubes 81 and 82 provided with a suitable biasing potential by cathode biasing network 83 and connected for push-pull excitation by grid input transformer 84 and plate output transformer 85. The screen grids 86 and 87 of the tubes are connected in parallel and returned to ground through resistance 88 across which a positive gating impulse from delay generator 29 may be applied such as through input connection 89. In operation and responsive to an angular displacement of the axis of directivity relative to the line of arrival of the incoming energy, either a positive or a negative pulse signal depending on the sense of the displacement will appear at the output of the video amplifier. This signal is applied in push-pull relation to the grids of the tubes 81 and 82. In the initial state and in the absence of a gating signal applied to the screen grids, both tubes are in a blocked condition thereby prohibiting the passage therethrough of any echo signal except such echo signal that occurs during the existance of a range gating impulse. As aforementioned, the gating pulse is delayed from the transmission of an impulse and is timed to occur during the reception of a signal arriving from a predetermined range whereby only such signal will effect the automatic tracking system of the invention. The positive gating signal is of such amplitude as to drive the screen grids momentarily to the desired operating potential to thereby render the tubes in a condition to amplify such input signals as may be applied thereto.

The integrator circuit is shown as comprising a pair of oppositely connected diode rectifying elements 90 and 91 arranged with the cathode of tube 90 connected to the plate of 91 and the junction point of this connection returned to the output terminal of the secondary winding of the output transformer 85 of the gated amplifier. The purpose of the integrator circuit is to convert the pulse output from the gating circuit into a direct current signal having an amplitude and a polarity dependent upon the amplitude and sense of the pulse output from the corresponding angle channel video amplifier 42 or 44. To this end the plate of diode 90 is returned to ground through a suitable parallel resistance capacitance integrating circuit illustrated at 92. The time constant of this circuit is large in comparison to the pulse repetition rate of the system. Likewise the cathode of diode 91 is returned to ground through a similar time constant circuit indicated at 93. The positive direct voltage output from diode 91 is taken from across time constant circuit 93 and applied to one grid of duo-triode 94, and the negative direct voltage from diode 90 is taken from across time constant circuit 92 and applied to the other grid of duo-triode 94. Duo-triode 94 is provided as a means for applying the separate outputs from diodes 90 and 91 to a single output lead 31A or 32A for operation of the associated servo mechanism and train indicating tube 28. To this end the plates of duo-triode 94 are connected together and returned to a source of predetermined positive voltage 97 through common plate resistor 95. In a similar manner, the cathodes of duo-triode 94 are connected together and returned to a source of negative voltage 98 through common cathode load resistor 96. Plate load resistor 95, cathode load resistor 96 and voltage sources 97 and 98 are so selected that in the balanced condition where no voltage is developed by either of the diodes 90 or 91, indicating the condition of "on target," zero voltage will exist at the cathodes of tube 94. A negative voltage developed across time constant 92 associated with diode 90 and denoting angular displacement in one sense will increase the resistance of tube 94 to thereby cause the cathodes of this tube to drop negatively in voltage. Conversely, a positive voltage developed across time constant circuit 93 associated with diode 91, denoting angular displacement in an opposite sense, will decrease the resistance of tube 94 causing the cathodes of this tube to rise positively in voltage.

It will be apparent from the foregoing that the ability of the present invention to provide a highly stabilized balance point under fading or varying signal conditions is one of the several advantages provided by the present system. This feature comes about by virtue of the fact that each reflected pulse is received simultaneously in a plurality of angularly disposed zones of reception and the signal energy simultaneously existing in opposing zones are balanced against each other, whereby the usual unbalancing effects caused by signal fading between successive reflected pulses are obviated.

Although I have disclosed and described only a limited and specific embodiment of the present invention it must be understood that I am fully aware of the many modifications possible thereof. Accordingly this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. A radio locator system for determining the position of a source of incoming radio frequency energy, comprising a directional antenna system for providing a confined field of reception including a plurality of adjacent directional zones disposed in opposing angular relation about an axis of directivity, receiving means operable to receive energy from said energy source in all zones simultaneously, said receiving means including a channel operative to deliver a received signal component of reference phase, means combining substantially in phase opposition the radio frequency signals received from opposing zones thereby to produce a resultant energy signal for each pair of opposing zones each having a phase and an amplitude dependent respectively on the sense and degree of angular displacement of said axis of directivity relative to the direction of arrival of said incoming signal energy, means combining each of said resultant signal energies with said received signal of reference phase to produce an error signal for each pair of opposing zones, and means including rotational control mechanisms responsive to said error signals for rotating the axis of directivity into positional agreement with the direction of arrival of said incoming signal energy.

2. A radio locator system for determining the position of a source of incoming radio frequency energy, comprising a directional antenna system providing a confined field of reception including a plurality of adjacent directional zones of reception disposed in opposing divergent angular relation about an axis of directivity, receiving means operable to receive energy from said energy source in all zones simultaneously, said receiving means including a channel operative to deliver a received signal component of reference phase, means combining substantially in phase opposition the radio frequency signals received from opposing zones thereby to produce a resultant energy signal for each pair of opposing zones, each having a phase and an amplitude dependent respectively on the sense and degree of angular displacement of the axis of directivity relative to the direction of arrival of said incoming signal energy, and means for comparing the phase of the received signal component of reference phase with the phase of the resultant signal energies thereby to indicate the degree of correspondence between the axis of directivity and the direction of arrival of the incoming signal energy.

3. A radio locator, comprising means for transmitting radio frequency energy pulses, a directional antenna system providing a confined field of reception including a plurality of adjacent zones of reception disposed in opposing angular relation about an axis of directivity, receiving means operatively associated with said antenna system for simultaneously receiving in all zones said radio frequency pulses after reflection from a remote object, said receiving means further including a channel operative to deliver a received signal component of reference phase, means combining substantially in phase opposition the radio frequency signals received from opposing zones thereby to produce a resultant energy signal for each pair of opposing zones each having a phase and an amplitude dependent respectively on the sense and degree of angular displacement of said axis of directivity relative to the direction of arrival of the reflected energy signal, and means for comparing the phase of the received signal component of reference phase with the phase of the resultant signal energies thereby to indicate the degree of correspondence between the axis of directivity and the direction of arrival of the reflected signal energy.

4. A radio locator, comprising means for transmitting radio frequency energy pulses, a directional antenna system providing a confined field of reception including a plurality of adjacent zones of reception disposed in opposing angular relation about an axis of directivity, receiving means operatively associated with said antenna system for simultaneously receiving in all zones said radio frequency pulses after reflection from a remote object, said receiving means further including a channel operative to deliver a received signal component of reference phase, means combining substantially in phase opposition the radio frequency signals received from opposing zones thereby to produce a resultant energy signal for each pair of opposing zones each having a phase and an amplitude dependent respectively on the sense and degree of angular displacement of said axis of directivity relative to the direction of arrival of the reflected energy signal, means combining each of said resultant signal energies with said received signal of reference phase thereby to produce an error signal for each pair of opposing zones of reception, and means including rotational control mechanisms responsive to said error signals for rotating the axis of directivity into positional agreement with the direction of arrival of said incoming signal energy.

5. A radio locator system for determining the position of a source of incoming radio frequency energy, comprising a directional antenna system for providing a confined field of reception including a plurality of adjacent directional zones disposed in opposing angular relation about an axis of directivity, receiving means operable to receive energy from said energy source in all zones simultaneously, said receiving means including a channel operative to deliver a received signal component of reference phase, means combining substantially in phase opposition the radio frequency signals received from opposing zones, thereby to produce a resultant energy signal for each pair of opposing zones each having a phase and an amplitude dependent respectively on the sense and degree of angular displacement of said axis of directivity relative to the direction of arrival of said incoming signal energy, means vectorially adding and subtracting said received signal component of reference phase to each of said resultant signal energies whereby there is produced a pair of vector component signals for each resultant energy signal; summation means combining in opposition the vector component signals of each pair to thereby produce an error signal for each pair of opposing zones, and means including indicator means operative responsive to said error signals to indicate the degree and sense of said angular displacement.

6. A radio locator system for determining the position of a source of incoming radio frequency energy, comprising a directional antenna system for providing a confined field of reception including a plurality of adjacent directional zones disposed in opposing angular relation about an axis of directivity, receiving means operable to receive energy from said energy source in all zones simultaneously, said receiving means including a channel operative to deliver a received signal component of reference phase, means combining substantially in phase opposition the radio frequency signals received from opposing zones thereby to produce a resultant energy signal for each pair of opposing zones each having a phase and an amplitude dependent respectively on the sense and degree of angular displacement of said axis of directivity relative to the direction of arrival of said incoming signal energy, means vectorially adding and subtracting said received signal component of reference phase to each of said resultant signal energies whereby there is produced a pair of vector component signals for each resultant energy signal, rectifying means combining in opposition the vector component signals of each pair to thereby produce an error signal for each pair of opposing zones, and cathode ray tube indicating apparatus operative responsive to said error signal to indicate the degree and sense of said angular displacement.

7. A radio locator system for determining the position of a source of incoming radio frequency energy, comprising a directional antenna system for providing a confined field of reception including a plurality of adjacent directional zones disposed in opposing angular relation about an axis of directivity, receiving means operable to receive energy from said energy source in all zones simultaneously, said receiving means including a channel operative to deliver a received signal component of reference phase, means combining substantially in phase opposition the radio frequency signals received in opposing zones thereby to produce a resultant energy signal for each pair of opposing zones each having a phase and an amplitude dependent respectively on the sense and degree of angular displacement of said axis of directivity relative to the direction of arrival of said incoming signal energy, means vectorially adding and subtracting said received signal component of reference phase to each of said resultant signal energies whereby there is produced a pair of vector component signals for each resultant energy signal, rectifying means combining in opposition the vector component signals of each pair to thereby produce an error signal for each pair of opposing zones, and means including rotational control mechanisms responsive to said error signals for rotating the axis of directivity into positional agreement with the direction of arrival of said incoming signal energy.

8. A radio locator system for determining the position of a source of incoming radio frequency energy comprising a directional antenna system for providing a confined field of reception including four adjacent directional zones of reception arranged in up, down, right and left angular relation about an axis of directivity, receiving means operable to receive energy from all zones simultaneously, said receiving means including a channel operative to deliver a received signal component having a reference phase, means combining substantially in phase opposition the radio frequency signals received from opposing zones thereby to produce a pair of resultant energy signals, one of said resultant energy signals having a phase and an amplitude dependent respectively upon the sense and degree of elevational displacement between the axis of directivity and the direction of arrival of said incoming signal energy, the other of said resultant energy signals having a phase and an amplitude dependent upon the azimuthal displacement of the axis of directivity relative to said direction of arrival, means vectorially adding and subtracting said received signal component of reference phase to each of said resultant energy signals thereby to produce a pair of vector component signals for each of said resultant signal energies, means combining in opposition the vector component signals of each pair thereby to produce a resultant error signal for each pair of opposing zones, and a cathode ray tube indicating apparatus operative responsive to said error signal for indicating the sense and degree of said angular displacement.

9. A radio locator system for determining the position of a source of incoming radio frequency energy, comprising a directional antenna system for providing a confined field of reception including four adjacent directional zones of reception arranged in up, down, right and left angular relation about an axis of directivity, receiving means operable to receive energy from all zones simultaneously, said receiving means including a channel operative to deliver a received signal component having a reference phase, means combining substantially in phase opposition the radio frequency signals received from opposing zones thereby to produce a pair of resultant energy signals, one of said resultant energy signals having a phase and an amplitude dependent respectively upon the sense and degree of elevational displacement between the axis of directivity and the direction of arrival of said incoming signal energy, the other of said resultant energy signals having a phase and an amplitude dependent upon the azimuthal displacement of the axis of directivity relative to said direction of arrival, means vectorially adding and subtracting said received signal component of reference phase to each of said resultant energy signals thereby to produce a pair of vector component signals for each of said resultant signal energies, means combining in opposition the vector component signals of each pair thereby to produce a resultant error signal for each pair of opposing zones, and means including rotational control mechanisms operative responsive to said error signal for rotating the axis of directivity into positional agreement with the direction of arrival of said incoming signal energy.

10. A radio locator, comprising means for transmitting radio frequency energy pulses, a directional antenna system providing a confined field of reception including a plurality of adjacent zones of reception disposed in opposing angular relation about an axis of directivity, receiving means operatively associated with said antenna system for simultaneously receiving in all zones said radio frequency pulses after reflection thereof from a remote object, said receiving means further including a channel operative to deliver a received signal component of reference phase, means combining substantially in phase opposition the radio frequency signals received from opposing zones thereby to produce a resultant energy signal for each pair of opposing zones each having a phase and an amplitude dependent respectively on the sense and degree of angular displacement of said axis of directivity relative to the direction of arrival of the reflected energy signal, means vectorially adding and subtracting said received signal component of reference phase to each of said resultant signal energies whereby there is produced a pair of vector component signals for each resultant energy signal, rectifying means combining in opposition the vector component signals of each pair to thereby produce an error signal for each pair of opposing zones, and indicator means responsive to said error signals to indicate the degree and sense of said angular displacement.

References Cited in the file of this patent

UNITED STATES PATENTS

| | | |
|---|---|---|
| 2,409,448 | Rost et al. | Oct. 15, 1946 |
| 2,423,104 | Labin | July 1, 1947 |
| 2,456,666 | Agate et al. | Dec. 21, 1948 |
| 2,470,939 | Miller et al. | May 24, 1949 |
| 2,480,829 | Barrow et al. | Sept. 6, 1949 |
| 2,608,683 | Blewett | Aug. 26, 1952 |
| 2,682,656 | Phillips | June 29, 1954 |
| 2,721,320 | Sommers | Oct. 18, 1955 |
| 2,825,057 | Worthington | Feb. 25, 1958 |